US008907587B2

(12) United States Patent
Guckin et al.

(10) Patent No.: US 8,907,587 B2
(45) Date of Patent: Dec. 9, 2014

(54) STAND-ALONE SYNCHRONIZATION FOR A RUNWAY LIGHT

(75) Inventors: Mark E. Guckin, Middletown, CT (US); Durairaj Kumar, Tamilnadu (IN)

(73) Assignee: Cooper Technologies Company, Houston, TX (US)

( * ) Notice: Subject to any disclaimer, the term of this patent is extended or adjusted under 35 U.S.C. 154(b) by 352 days.

(21) Appl. No.: 13/557,987

(22) Filed: Jul. 25, 2012

(65) Prior Publication Data

US 2014/0028218 A1 Jan. 30, 2014

(51) Int. Cl.

| | |
|---|---|
| ***G05F 1/00*** | (2006.01) |
| ***H05B 37/02*** | (2006.01) |
| ***H05B 39/04*** | (2006.01) |
| ***H05B 41/36*** | (2006.01) |
| ***B60Q 1/14*** | (2006.01) |
| ***B64D 47/02*** | (2006.01) |
| ***B64F 1/20*** | (2006.01) |
| ***F21V 1/20*** | (2006.01) |
| ***F21V 21/00*** | (2006.01) |

(52) U.S. Cl.
USPC .............................. 315/294; 315/77; 362/470

(58) Field of Classification Search
None
See application file for complete search history.

(56) References Cited

U.S. PATENT DOCUMENTS

| | | | | |
|---|---|---|---|---|
| 5,239,236 | A | 8/1993 | Backstrom et al. | |
| 5,485,151 | A | 1/1996 | Runyon et al. | |
| 5,556,189 | A | 9/1996 | Wallis | |
| 5,903,103 | A * | 5/1999 | Garner | 315/76 |
| 5,926,115 | A | 7/1999 | Schleder et al. | |
| 6,119,055 | A | 9/2000 | Richman | |
| 6,608,743 | B1 * | 8/2003 | Suzuki | 361/100 |
| 7,023,361 | B1 | 4/2006 | Wallace et al. | |
| 7,088,263 | B1 | 8/2006 | Krause et al. | |
| 7,192,155 | B2 | 3/2007 | Morrow et al. | |
| 7,629,601 | B2 | 12/2009 | Glassner et al. | |
| 7,654,720 | B2 | 2/2010 | Glassner | |
| 8,129,908 | B2 * | 3/2012 | Roebke et al. | 315/77 |
| 8,138,683 | B2 | 3/2012 | Catoul et al. | |
| 2009/0091268 | A1 | 4/2009 | Forssen et al. | |
| 2009/0200946 | A1 | 8/2009 | Facchini | |
| 2011/0031896 | A1 | 2/2011 | Vandevoorde et al. | |

FOREIGN PATENT DOCUMENTS

| | | | |
|---|---|---|---|
| EP | 2168872 | A2 | 3/2010 |
| WO | 9914989 | | 3/1999 |
| WO | 2010049224 | A2 | 5/2010 |

OTHER PUBLICATIONS

ADB Airfield Solutions, ADB L 852G In-pavement Runway Guard Light (IRGL), Installation manual, Sep. 2010, 37 pages, 96A0401, Rev. E 20, ADB Airfield Solutions, LLC.

* cited by examiner

*Primary Examiner* — Douglas W Owens
*Assistant Examiner* — Dedei K Hammond
(74) *Attorney, Agent, or Firm* — King & Spalding LLP

(57) ABSTRACT

A method of providing synchronous control for a number of light-emitting diode (LED) units within a LED fixture is described herein. The method can include receiving an input signal. The method can also include sending, in response to receiving the input signal and for a period of time, a power-on delay signal to the LED units, wherein each LED unit includes a counter, a toggle, and a LED driver, where the power-on delay signal resets the counter, initializes the toggle, and disables the LED driver. The method can also include terminating, after the period of time, the power-on delay signal. A LED fixture and a LED unit within a fixture, having one or more components performing the aforementioned method, is also described herein.

20 Claims, 6 Drawing Sheets

STAND-ALONE SYNCHRONIZATION FOR A RUNWAY LIGHT

TECHNICAL FIELD

The present disclosure relates generally to runway lights and more particularly to systems, methods, and devices for stand-alone synchronization for a runway light, such as a L852G inset runway guard light bar.

BACKGROUND

A number of runway lights used at airports are externally controlled. In other words, signals associated with power, synchronization, and/or other control functions originate from a centralized location, external to the light source. In such a configuration, costs and use of materials can be high. In addition, airport runway lights are subject to meeting one or more of a number of standards under the Federal Aviation Administration (FAA) and other similar regulatory bodies in countries or regions outside the United States, such as the European Aviation Safety Agency (EASA).

There are a number of different categories of runway lights. Examples of such categories include, but are not limited to, guidance signs, approach lights and in-pavement lights. In addition, each category of runway light has a number of different model numbers, many of which are set by a regulatory agency such as the FAA to serve a particular function. For example, the model L-852G light is a type of in-pavement light that is used as a runway guard light to prevent a plane from entering a portion of a runway or taxiway from the wrong direction. Some such runway lights use light-emitting diode (LED) technology because of improved efficiency, operating life, and light qualities.

SUMMARY

In general, in one aspect, the disclosure relates to a method of providing synchronous control for a number of light-emitting diode (LED) units within a LED fixture. The method can include receiving an input signal. The method can also include sending, in response to receiving the input signal and for a period of time, a power-on delay signal to the LED units, where each LED unit includes a counter, a toggle, and a LED driver, where the power-on delay signal resets the counter, initializes the toggle, and disables the LED driver. The method can further include terminating, after the period of time, the power-on delay signal. In another aspect, the disclosure can generally relate to a light-emitting diode (LED) fixture that includes a number of LED units. The LED fixture can include a LED driver having a number of states that can include a disabled state and an enabled state, where the LED driver controls at least one LED. The LED fixture can also include a toggle communicably coupled to the LED driver and having a number of states that can include a default state, an on state, and an off state, where the toggle sends a number of signals to the LED driver to activate one of the states of the LED driver. The LED fixture can further include a counter communicably coupled to the toggle and configured to send a carry bit to the toggle. The LED fixture can also include a power-on delay module that can be configured to receive input power derived from a power source. The power-on delay module can also be configured to send, based on receiving the input power, a power-on delay signal to the LED driver, the toggle, and the counter for a period of time. The power-on delay module can further be configured to terminate the power-on delay signal after the period of time expires. The power-on delay signal can reset the counter, initialize the toggle, and disable the LED driver during the period of time.

In yet another aspect, the disclosure can generally relate to a light-emitting diode (LED) unit. The LED unit can include a LED driver having a number of states that can include a disabled state and an enabled state, where the LED driver controls at least one LED. The LED unit can also include a toggle communicably coupled to the LED driver and having a number of states that can include an on state and an off state, where the toggle sends a number of signals to the LED driver to activate one of the states of the LED driver. The LED unit can further include a counter communicably coupled to the toggle and configured to send a carry bit to the toggle. The LED unit can also include a power-on delay module that can be configured to receive input power derived from a power source. The power-on delay module can also be configured to send, based on receiving the input power, a power-on delay signal to the LED driver, the toggle, and the counter for a period of time. The power-on delay module can further be configured to terminate the power-on delay signal after the period of time expires. The power-on delay signal can reset the counter, initialize the toggle, and disable the LED driver during the period of time.

These and other aspects, objects, features, and embodiments will be apparent from the following description and the appended claims.

BRIEF DESCRIPTION OF THE DRAWINGS

The drawings illustrate only exemplary embodiments and are therefore not to be considered limiting in scope, as the exemplary embodiments may admit to other equally effective embodiments. The elements and features shown in the drawings are not necessarily to scale, emphasis instead being placed upon clearly illustrating the principles of the exemplary embodiments. Additionally, certain dimensions or positionings may be exaggerated to help visually convey such principles. In the drawings, reference numerals designate like or corresponding, but not necessarily identical, elements.

DETAILED DESCRIPTION

Figure 1:
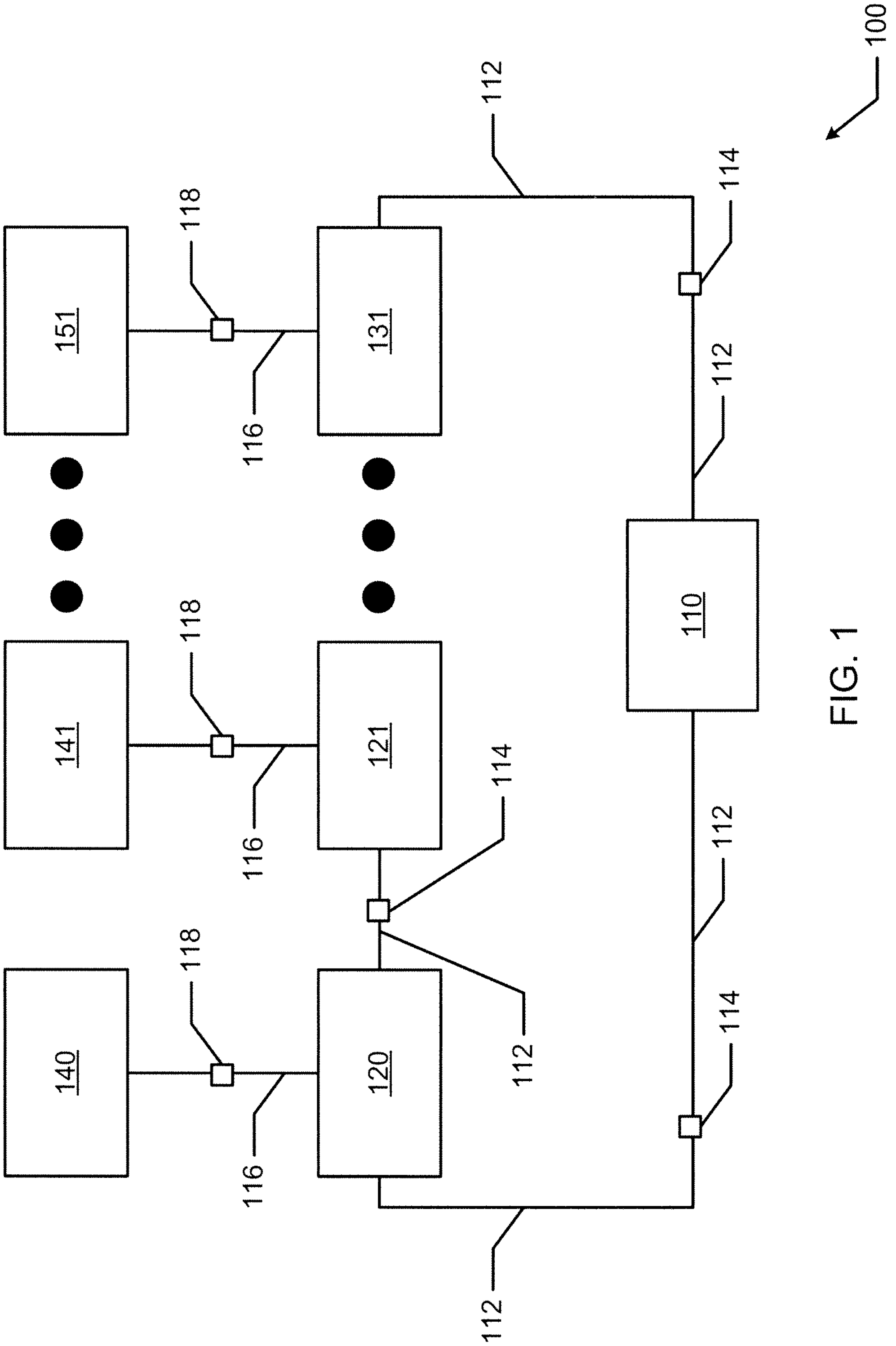
FIG. 1 shows a system drawing of a LED fixture having multiple LED units in which certain exemplary embodiments may be implemented.

Exemplary embodiments of stand-alone synchronization for a runway light will now be described in detail with reference to the accompanying figures. Like, but not necessarily the same or identical, elements in the various figures are denoted by like reference numerals for consistency. In the following detailed description of the exemplary embodiments, numerous specific details are set forth in order to provide a more thorough understanding of the disclosure herein. However, it will be apparent to one of ordinary skill in the art that the exemplary embodiments herein may be practiced without these specific details. In other instances, well-known features have not been described in detail to avoid unnecessarily complicating the description. Further, certain descriptions (e.g., top, bottom, side, end, interior, inside, inner, outer) are merely intended to help clarify aspects and are not meant to limit embodiments described herein.

In general, exemplary embodiments provide systems, methods, and devices for stand-alone synchronization for a runway light Specifically, exemplary embodiments provide for synchronizing a runway light having multiple LED units, where the synchronization is performed using controls entirely within the runway light. As used herein, a runway light is an exemplary term used to describe any type of light used in airfield applications, including but not limited to runways and taxiways. Further, as used herein, a runway light can be used with respect to one or more type of aircraft, including but not limited to airplanes, helicopters, and hovercraft. In addition, the runway light can apply to one or more of a number of different models of lights. For example, a model L852G light, as designated by the FAA, is an in-ground light used to identify an intersection of a taxiway with an active runway. In other words, the L852G is used to notify a pilot of a taxiing plane on a taxiway not to take a certain path because that path leads to an active runway.

Further, while the exemplary embodiments discussed herein are described with reference to airfield applications, exemplary embodiments can be applied to one or more of a number of other applications. Examples of such other applications include, but are not limited to, emergency beacons and egress lighting.

With regard to an airfield application, such as for a model L852G light, the exemplary stand-alone synchronization can be used to replace, or be used in conjunction with, an external controller and/or monitoring device. In other words, an airfield light using exemplary stand-alone synchronization eliminates the need for additional cable, wiring, memory, processing capability, communication links, one or more junction boxes, one or more terminal blocks, conduit, and other features used in conjunction with an external controller and/or monitoring device.

A user may be any person that interacts with a light using the exemplary stand-along synchronization. Examples of a user may include, but are not limited to, a pilot, an air traffic controller, an engineer, an electrician, an instrumentation and controls technician, a mechanic, an operator, a consultant, a contractor, and a manufacturer's representative.

The exemplary stand-alone synchronization is triggered by, and operates based upon, a periodic and/or cyclical electrical signal. Such an electrical signal can include a voltage and/or current having any of a number of voltage values and/or current values. Such an electrical signal can operate on one or more of a number of frequencies, including but not limited to 60 Hz and 50 Hz. In certain exemplary embodiments, a light fixture can operate on different frequencies based on one or more of a number of conditions, including but not limited to hardware settings, software programming, and the setting of a switch on or within the light fixture.

In certain exemplary embodiments, a light fixture using exemplary stand-alone synchronization is subject to meeting certain standards and/or requirements. For example, the FAA sets standards as model numbers, approved vendors for such model numbers, and performance standards that such model numbers must meet. For example, the FAA publishes a number of Advisory Circulars (e.g., AC 150/5340-30, AC 150/5346-46) that list that design, operation, and other requirements for the model L852G runway light. An example of a FAA requirement regarding the model L852G light is that the light fixture blinks at a rate of 30-32 blinks per minute with a 50% duty cycle. In addition, the light fixture has an even number of light units, where half of the light units blink 180 degrees out of phase with the other half of the light units.

FIG. 1 depicts a LED fixture system 100 in which certain exemplary embodiments may be implemented. The system 100 includes a constant current regulator (CCR) 110, a number of isolation transformers (e.g., isolation transformer 1 120, isolation transformer 2 121, isolation transformer N 131), a corresponding number of LED units (e.g., LED unit 1 140, LED unit 2, 141, LED unit N 151), conductors 112, 116, and disconnect devices 114, 118. In one or more embodiments, one or more of the components shown in FIG. 1 may be omitted, repeated, and/or substituted. Accordingly, embodiments of LED fixture systems should not be considered limited to the specific arrangements of components shown in FIG. 1.

The CCR 110 of the LED fixture system 100 receives input power (also called an input signal) derived directly or indirectly from a power source external to the LED fixture system 100 and regulates such input power. In one or more exemplary embodiments, the CCR 110 regulates the input power by controlling the root-mean-square (RMS) value of the input power. The input power can be a voltage and/or a current, discrete and/or continuous, alternating current (AC) and/or direct current (DC), and provide for power and/or control. Further, the input power can have one or more of a number of shapes that are repeatable and have a zero crossing (defined below). Examples of shapes of the input power can include, but are not limited to, sinusoidal, chopped sine wave, and rectified sinusoidal (when used with a peak detector). The power source external to the LED fixture system 100 can be any component, system, or device suitable for generating and sending a signal. The CCR 110 is electrically coupled to the power source external to the LED fixture system 100.

In certain exemplary embodiments, the CCR 110 regulates the signal derived from the power source in one or more of a number of ways. For example, the CCR 110 can be a type of transformer having a primary winding that is electromagnetically coupled to a secondary winding. In addition, or in the alternative, the CCR 110 can include one or more of a number of discrete components (e.g., resistor, capacitor), a microprocessor-controlled device, other hardware, and/or software-driven components. In addition, the CCR 110 is sized (e.g., 1 kVA) appropriately for the system 100 and its requirements.

In certain exemplary embodiments, the CCR 110 is electrically coupled to the isolation transformers (e.g., isolation transformer 1 120, isolation transformer 2 121, isolation transformer N 131) using a number of conductors 112. Each conductor 112 can be a single conductor or one of a number of conductors within a cable. The conductor 112 can be one of a number of sizes, such as 22 American wire gauge (AWG) or #18. One conductor 112 can be the same (e.g., size, material) or different than the other conductors 112.

Further, when a conductor 112 is used to electrically couple the CCR 110 to the isolation transformers (e.g., isolation transformer 1 120, isolation transformer 2 121, isolation transformer N 131), a hardwire connection can be made. One or more of a number of connecting devices 114 may be used to create the hardwire connection. Examples of such connecting devices 114 may include, but are not limited to, a spade connection, a pin connection, soldering, a compression fitting, and a terminal block. In certain exemplary embodiments, the connecting device 114 can be a form of disconnect to isolate one or more isolation transformers. Examples of such a connecting device 114 can include, but are not limited to, a switch, a fuse block, and a disconnect.

Other types of wires, cables, and/or wireless technology may be used in conjunction with a conductor 112 to couple the CCR 110 to the isolation transformers (e.g., isolation transformer 1 120, isolation transformer 2 121, isolation transformer N 131). In addition, the CCR 110 can be communicably coupled to a user (not shown) and/or a user system (also not shown) using one or more of any type of cable and/or wireless technology, including but not limited to a conductor.

Each isolated transformer receives a regulated control signal from the CCR 110 and generates input signal based on the regulated control signal. In certain exemplary embodiments, each of the isolation transformers (e.g., isolation transformer 1 120, isolation transformer 2 121, isolation transformer N 131) has a primary winding that is electromagnetically coupled to a secondary winding. As a regulated signal from the CCR 110 flows through the primary winding of a isolation transformer, the input signal is electromagnetically induced in the secondary windings. The magnitude of the input signal is based on a ratio of the primary winding when compared to the secondary winding. The ratio can also be based on one or more of a number of factors, including but not limited to the material of the primary and secondary windings, the size of the wire used for the primary and secondary windings, and the distance between the primary and secondary windings. In addition, each isolation transformer is sized (e.g., 500 VA) appropriately for the LED unit and its requirements.

Any number (e.g., 12, 16, 8) of isolation transformers can be used in the system 100. The number of isolation transformers can be the same or different than the number of LED units (e.g., LED unit 1 140, LED unit 2, 141, LED unit N 151). For example, one isolation transformer can be used to electrically couple to multiple LED units. In certain exemplary embodiments, however, as shown in FIG. 1, a single LED unit is electrically coupled to the secondary side of a single isolation transformer.

In certain exemplary embodiments, the conductors 116 are used to electrically couple the isolation transformers (e.g., isolation transformer 1 120, isolation transformer 2 121, isolation transformer N 131) to the corresponding LED units (e.g., LED unit 1 140, LED unit 2, 141, LED unit N 151). Each conductor 116 can be a single conductor in a single cable or one of a number of conductors within a cable. The conductors 116 can be one of a number of sizes. The conductor 116 can be the same (e.g., have substantially the same size, be made of substantially the same material) or different than the conductors 112 that electrically couple the CCR 110 to the isolation transformers (e.g., isolation transformer 1 120, isolation transformer 2 121, isolation transformer N 131).

Further, when the conductor 116 is used to electrically couple the isolation transformers (e.g., isolation transformer 1 120, isolation transformer 2 121, isolation transformer N 131) to the corresponding LED units (e.g., LED unit 1 140, LED unit 2, 141, LED unit N 151), a hardwire connection can be made. One or more of a number of connecting devices 118 may be used to create such a hardwire connection. Examples of such connecting devices 118 may include, but are not limited to, a pin receiver, a spade connection, soldering, a compression fitting, and a terminal block. In certain exemplary embodiments, the connecting device 118 can be a form of disconnect to isolate one or more isolation transformers. Examples of such a connecting device 118 can include, but are not limited to, a switch, a fuse block, and a disconnect.

Other types of wires, cables, and/or wireless technology may be used in conjunction with the conductor 116 to couple the isolation transformers (e.g., isolation transformer 1 120, isolation transformer 2 121, isolation transformer N 131) to the corresponding LED units (e.g., LED unit 1 140, LED unit 2, 141, LED unit N 151). In addition, one or more of the corresponding LED units (e.g., LED unit 1 140, LED unit 2, 141, LED unit N 151) may be communicably coupled to a user (not shown) and/or a user system (also not shown) using one or more of any type of cable and/or wireless technology, including but not limited to the conductor 116.

The LED units (e.g., LED unit 1 140, LED unit 2, 141, LED unit N 151) illuminate according to one or more control parameters within each LED unit. Details of the exemplary LED units are described below with respect to FIG. 2. Any number (e.g., 12, 16, 8) of LED units can be used in the system 100. As described above, the number of LED units can be the same or different than the number of isolation transformers. In certain exemplary embodiments, however, as shown in FIG. 1, a single LED unit is electrically coupled to the secondary side of a single isolation transformer.

When the system 100 includes multiple isolation transformers, such transformers can be electrically coupled to each other in series, in parallel, or any suitable combination thereof Further, each of the multiple isolation transformers can be configured substantially the same as (e.g., have substantially the same turn ratio between primary and secondary windings, made of substantially the same material) or differently from other isolation transformers in the system 100. Likewise, when the system 100 includes multiple LED units that are electrically coupled to a single isolation transformer, such multiple LED units can be electrically coupled to each other in series, in parallel, or any suitable combination thereof Further, each of the multiple LED units can be configured substantially the same as (e.g., have substantially the same counter, have substantially the same toggle switch) or differently from other LED units in the system 100.

Figure 2:
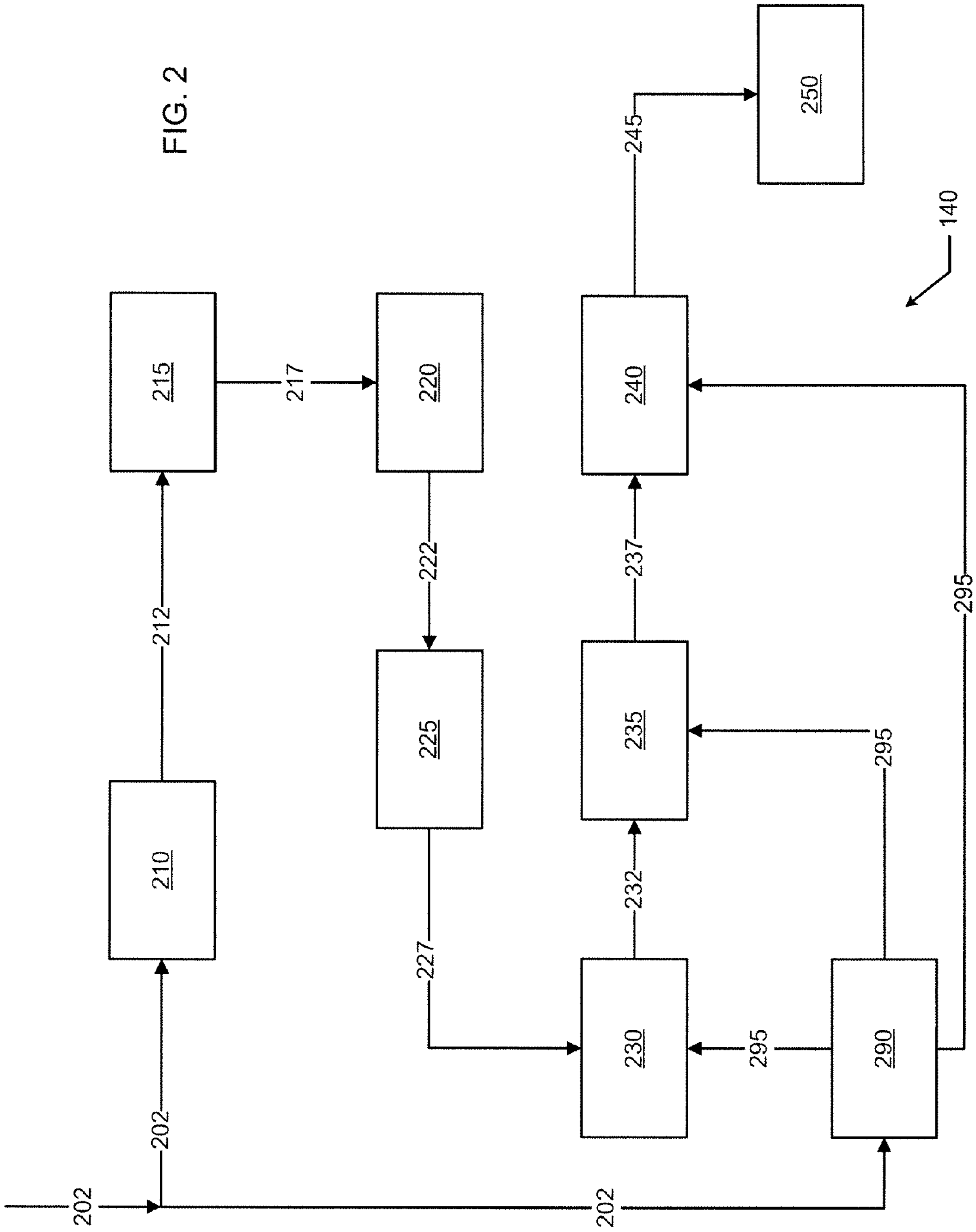
FIG. 2 shows an exemplary LED unit in accordance with certain exemplary embodiments.

FIG. 2 shows an exemplary LED unit (e.g., LED unit 1 140) in accordance with certain exemplary embodiments. In one or more embodiments, one or more of the components shown in FIG. 2 may be omitted, repeated, and/or substituted. Accordingly, embodiments of an LED unit should not be considered limited to the specific arrangements of components shown in FIG. 2.

Referring now to FIGS. 1 and 2, the LED unit 140 of FIG. 2 includes an optional transformer 210, an optional amplifier 215, an optional filter 220, a detector 225, a counter 230, a toggle switch 235, a LED driver 240, at least one LED 250, and a power-on delay timer 290. The transformer 210 receives the input signal 202 (also called the input power or input signal, derived from a power source) generated by the secondary winding of the isolation transformer and sent using the conductor 116. The transformer 210 can be any type of transformer, including but not limited to a current sense transformer and a voltage sense transformer. The winding ratio of the transformer 210 can be any ratio suitable to reduce the input signal to a manageable level for the remainder of the components in the LED unit 140. An example of a winding ratio can be 100:1. The transformer 210 transforms the input signal 202 into a transformed input signal 212. In certain exemplary embodiments, the transformer 210 is omitted from the LED unit 140 when the input signal 202 generated by the isolation transformer is already at a suitable level for the remainder of the components in the LED unit 140. In addition, the transformer 210 is sized (e.g., 500 VA) appropriately for the LED unit 140 and its requirements.

The optional amplifier 215 amplifies the transformed input signal 212 to generate an amplified input signal 217. In certain exemplary embodiments, the amplifier 215 is an operational amplifier. In addition, or in the alternative, the amplifier

215 can include one or more of a number of discrete components (e.g., resistor, capacitor), a microprocessor-controlled device, other hardware, and/or software-driven components.

In certain exemplary embodiments, the optional filter 220 can filter out certain components (e.g., high frequency components) of the amplified input signal 217 to generate a filtered signal 222. The high frequency components of the amplified input signal 217 can include "noise" and other high frequencies (e.g., greater than 200 Hz) that can distort the remainder of the amplified input signal 217. The exemplary filter 220 can include a number of discrete components (e.g., resistor, capacitor). In addition, or in the alternative, the filter 220 can include an integrated circuit. The filter 220 may be called a low pass filter. The filter 220 can be an active filter (e.g., an active low pass filter) or a passive filter (e.g., a passive low pass filter).

In certain exemplary embodiments, the detector 225 is operatively coupled to the filter 220. The detector 225 receives the filtered signal 222 from the filter 220 and processes the filtered signal 222 to generate a pulse signal 227. Specifically, the detector 225 alters the shape of the wave form representing the filtered signal 222. As the filtered signal 222 crosses "zero" (i.e., the horizontal axis representing time, when compared with a vertical axis representing amplitude), the detector 225 starts or ends a pulse wave for the pulse signal 227.

For example, if the detector 225 is a positive transition zero crossing detector, then the detector 225 begins a pulse wave of the pulse signal 227 when the filtered signal 222 crosses zero in the direction of a positive amplitude (i.e., above the horizontal axis) and ends the pulse wave of the pulse signal 227 when the filtered signal 222 subsequently crosses zero in the positive direction. The detector 225 then begins a subsequent pulse wave of the pulse signal 227 when the filtered signal 222 subsequently crosses zero in the positive direction, and the process repeats itself. In such a case, the width of the pulse wave of the pulse signal 227 is approximately the same as a full cycle of the filtered signal 222.

As another example, if the detector 225 is a negative transition zero crossing detector, then the detector 225 begins a pulse wave of the pulse signal 227 when the filtered signal 222 crosses zero in the direction of a negative amplitude (i.e., below the horizontal axis) and ends the pulse wave of the pulse signal 227 when the filtered signal 222 subsequently crosses zero in the negative direction. The detector 225 then begins a subsequent pulse wave of the pulse signal 227 when the filtered signal 222 subsequently crosses zero in the negative direction, and the process repeats itself. Again, in such a case, the width of the pulse wave of the pulse signal 227 is approximately the same as a full cycle of the filtered signal 222.

As yet another example, if the detector 225 is a positive and negative transition zero crossing detector, then the detector 225 begins a pulse wave of the pulse signal 227 when the filtered signal 222 crosses zero in the direction of a positive amplitude (i.e., above the horizontal axis) and ends the pulse wave of the pulse signal 227 when the filtered signal 222 crosses zero in the direction of a negative amplitude (i.e., below the horizontal axis). In such a case, the width of the pulse wave of the pulse signal 227 is approximately the same as a half cycle of the filtered signal 222. In certain exemplary embodiments, a multiplier (not shown) may be included with, and operatively coupled to, the detector 225. The multiplier can receive the ZCD signal and extend or shorten the width of the pulse wave of the pulse signal 227. For example, the multiplier can double the width of the pulse signal 227 so that the width of the pulse signal 227 generated by the positive and negative transition zero crossing detector goes from a half cycle of the filtered signal 222 to a full cycle of the filtered signal 222.

As another example, if the detector 225 is a peak detector, then the detector 225 begins a pulse wave of the pulse signal 227 when the filtered signal 222 reaches a peak, which can be with respect to a positive or negative amplitude. The detector 225 then ends the pulse wave of the pulse signal 227 when the filtered signal 222 subsequently reaches the peak, either with respect to the same amplitude or the opposite amplitude. The detector 225 then begins a subsequent pulse wave of the pulse signal 227 when the filtered signal 222 subsequently reaches a peak, and the process repeats itself. If the detector 225 ends the pulse wave of the pulse signal 227 when the filtered signal 222 subsequently reaches the peak with respect to the same amplitude, then the width of the pulse wave of the pulse signal 227 is approximately the same as a full cycle of the filtered signal 222. If the detector 225 ends the pulse wave of the pulse signal 227 when the filtered signal 222 subsequently reaches the peak with respect to the opposite amplitude, then the width of the pulse wave of the pulse signal 227 is approximately the same as a half cycle of the filtered signal 222. In such a case, the detector 225 may include a multiplier to extend or shorten the width of the pulse wave of the pulse signal 227, as explained above.

As yet another example, the detector 225 can include a rectifier (not shown). In such a case, the rectifier can receive the filtered signal 222 from the filter 220 and convert any portions of the filtered signal 222 having a negative amplitude to a positive amplitude. Similarly, the rectifier can receive the filtered signal 222 from the filter 220 and convert any portions of the filtered signal 222 having a positive amplitude to a negative amplitude. In such a case, the detector 225 can also include a multiplier to extend or shorten the width of the pulse wave of the pulse signal 227, as explained above. In certain exemplary embodiments, when a rectifier is used and results in no zero crossing, a peak detector and/or other component can be added to simulate or create a zero crossing.

In certain exemplary embodiments, the counter 230 is operatively coupled to the detector 225. The counter 230 receives the pulse signal 227 from the detector 225 and registers a count for each pulse wave of the pulse signal 227. The counter 230 can have any of a number of states in its counting sequence. For example, the counter 230 can be a modulo 60 counter, which means that in a 60 Hz system, such a counter finishes its counting sequence once every second. In certain exemplary embodiments, the counter 230 generates a carry bit 232 for every pulse wave of the pulse signal 227. In other words, if the counter 230 is a modulo 60 counter, then the counter 225 generates a carry bit 232 every second. The number of states in the counting sequence of the counter 225 can be set and/or altered by a switch, a change in software instructions, an occurrence of an event, some other suitable change, or any combination thereof.

In certain exemplary embodiments, the toggle 235 is operatively coupled to the counter 230. The toggle 235 has two or more states. For example, if the toggle 235 has only two states, those states may be "set" and "reset." The toggle 235 receives the carry bits 232 from the counter 230 and changes states when a carry bit 232 is received. The state of the toggle 235 may change every time a carry bit 232 is received. Alternatively, the state of the toggle 235 can change when a certain number of carry bits 232 are received. If there are more than two states, then the states are changed according to some predetermined sequence, which may be based on one or more of a number of factors, including but not limited to the passage of time, a number of carry bits 232, and the occurrence of certain events.

The toggle 235 also generates an output based on the state of the toggle 235. The output of the toggle 235 can be an enabling command 237 for the LED driver 240. When a state of the toggle 235 changes, the output of the toggle 235 changes. For example, the toggle 235 having two states can send an "ON" signal when one state is active and an "OFF" signal when the other state is active.

In certain exemplary embodiments, the toggle 235 has a default state, which is the initial state of the toggle 235 when the toggle begins operation. For example, the default state of the toggle 235 can be "initial flash on" or "initial flash off." The default state can be determined using hardwire (e.g., using discrete components, integrated circuits) and/or software. The default state can be set and/or altered by a switch, a change in software instructions, an occurrence of an event, some other suitable change, or any combination thereof. When there are even-numbered multiple LED units 140 and if the toggle 235 has two states, then the default state of the toggle 235 for half of the LED units 140 can be one state, while the default state of the toggle 235 for the other half of the LED units 140 can be the other state.

In certain exemplary embodiments, the LED driver 240 is operatively coupled to the toggle 235. The LED driver 240 is a power supply for the LED 250. Specifically, the LED driver 240 receives the enabling command 237 (e.g., power, control), processes the power and/or control, and delivers the processed power and/or control (also called a LED signal 245) to the one or more LEDs 250. The LED driver 240 can include one or more discrete components (e.g., transformer, resistor, relay), one or more hardware processors, or any suitable combination thereof.

The LED driver 240 and the toggle 235 can each have a number of states. For example, the LED driver 240 can have an enabled state and a disabled state. As another example, the toggle 235 can have a default state, an "ON" state, and an "OFF" state. In certain exemplary embodiments, multiple states (e.g., the default state and the "ON" state for the toggle 235) can be the same state. The LED driver 240 receives the enabling command 237 from the toggle 235 and operates according to such enabling command 237. For example, if the enabling command 237 of the toggle 235 is an "ON" signal, then the LED driver 240 is enabled and illuminates the LED 250 that is electrically coupled to the LED driver 240. Likewise, if the enabling command 237 of the toggle 235 is an "OFF" signal, then the LED driver 240 is disabled and turns off the LED 250.

In certain exemplary embodiments, the power-on delay 290 is operatively coupled to the source generating the input signal 202, the counter 230, the toggle 235, and the LED driver 240. When the input signal 202 is received by the transformer 210, it is also simultaneously received by the power-on delay 290. The power-on delay 290 is activated when the input signal 202 is received. When activated, the power-on delay 290 provides a delay before the counter 230, the toggle 235, and the LED driver 240 are activated. Specifically, the power-on delay 290 sends a power-on delay signal 295 that resets the counter 230, initializes the toggle 235, and disables the LED driver 240 for a period of time.

In certain exemplary embodiments, the period of time is long enough for the various components (e.g., the counter, the toggle, the LED driver 240) of the LED unit 140 to become energized and for the input signal 202 to stabilize into a substantially consistent wave form. For example, the period of time can be approximately 8 seconds. The period of time during which the power-on delay 290 operates can be set and/or altered by a switch, a change in software instructions, an occurrence of an event, some other suitable change, or any combination thereof. When the period of time expires, the power-on delay signal 295 is terminated. In such a case, the counter 230, the toggle 235, and the LED driver 240 operate as described above, where the pulse signal 227 is received by the counter 230.

In certain exemplary embodiments, when the counter 230 is reset by the power-on delay signal 295, the counter 230 is receiving a pulse signal 227, derived from the input signal 202, from the detector 225. In such a case, the power-on delay signal 295 is constantly resetting the counter 230 for the period of time that the power-on delay signal 295 is sent by the power-on delay 290. Alternatively, the power-on delay signal 295 disables the counter 230 for the period of time in which the power-on delay 290 sends the power-on delay signal 295. In such a case, when the power-on delay 290 stops sending the power-on delay signal 295 to the counter 230, the counter is enabled 230 and begins counting based on the pulse signal 227 sent by the detector 225.

In certain exemplary embodiments, the power-on delay 290 sends the power-on delay signal 295 to some combination of the counter 230, the toggle 235, and the LED driver 240 other than all three components. For example, the power-on delay 290 can send the power-on delay signal 295 to only the counter 230, the toggle 235, or the LED driver 240. Alternatively, the power-on delay 290 can send the power-on delay signal 295 to only the counter 230 and the toggle 235, only the toggle 235 and the LED driver 240, or only the counter 230 and the LED driver 240.

When there are multiple LED units in the system 100, the period of time for each power-on delay 290 can be set to substantially the same time. In such a case, when the period of time expires, each LED unit is synchronized. Further, when there are an even number of LED units and when a default state of the toggle 235 for half of the LED units 140 is one state, while the default state of the toggle 235 for the other half of the LED units 140 is the other state, then a first half of the LEDs 250 in the system 100 are illuminated when the second half of the LEDs 250 are not illuminated. Likewise, when the first half of the LEDs 250 in the system 100 are not illuminated, then the second half of the LEDs 250 are illuminated.

Figure 3:
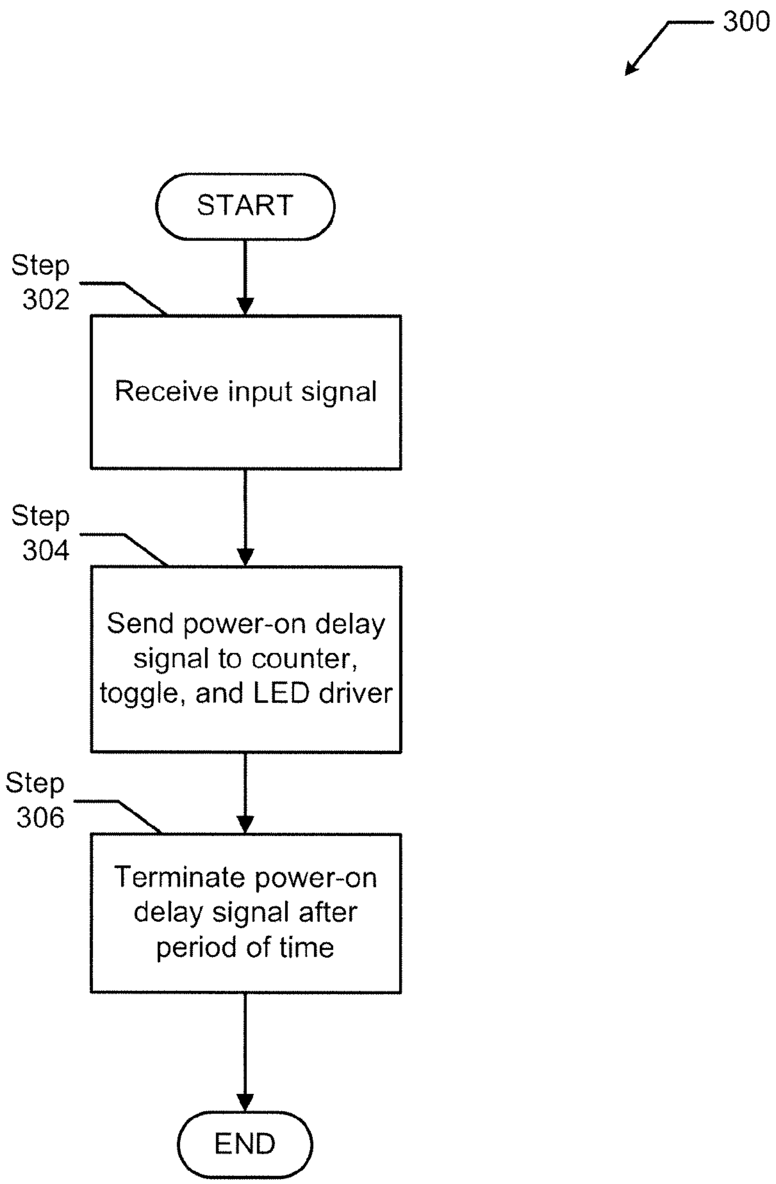
FIG. 3 is a flowchart presenting an exemplary method of providing synchronous control for a plurality of LED units within a LED fixture in accordance with certain exemplary embodiments.

FIG. 3 is a flowchart of an exemplary method 300 of providing synchronous control for a plurality of LED units within a LED fixture in accordance with certain exemplary embodiments. While the various steps in this flowchart are presented and described sequentially, one of ordinary skill will appreciate that some or all of the steps may be executed in different orders, may be combined or omitted, and some or all of the steps may be executed in parallel. Further, in one or more of the exemplary embodiments, one or more of the steps described below may be omitted, repeated, and/or performed in a different order. In addition, a person of ordinary skill in the art will appreciate that additional steps not shown in FIG. 3, may be included in performing this method. Accordingly, the specific arrangement of steps should not be construed as limiting the scope. In addition, a particular computing device, as described, for example, in FIG. 4 below, may be used to perform one or more of the steps for the method 300 described below.

Now referring to FIGS. 1-3, the exemplary method 300 begins at the START step and proceeds to step 302, where an input signal 202 is received. In certain exemplary embodiments, the input signal 202 is received by a power-on delay 290 of a LED unit 140. If there are multiple LED units 140 in a system 100, then a power-on delay 290 in each of the LED units receives the input signal 202. The input signal 202 can be an initial cycle of a number of substantially consistent cycles (in steady state) where each cycle has a zero crossing.

In step 304, a power-on delay signal 295 is sent to the counter 230, the toggle 235, and the LED driver 240. In certain exemplary embodiments, the power-on delay signal 295 is sent by the power-on delay 290. The power-on delay signal 295 can be sent for a certain period of time (e.g., 8 seconds). When the power-on delay signal 295 is sent to the counter 230, the counter 230 is reset. When the power-on delay signal 295 is sent to the toggle 235, the toggle 235 is initialized. In other words, the toggle 235 is put in its default state. When the power-on delay signal 295 is sent to the LED driver 240, the LED driver 240 is disabled.

In Step 306, the power-on delay signal 295 is terminated. In certain exemplary embodiments, the power-on delay signal 295 is terminated when the period of time has expired. When the power-on delay signal 295 is terminated, then the counter 230 operates based on the pulse signal 227, which is derived from the input signal 202 by the detector 225. The resulting carry bit 232 generated by the counter 230 is sent to the toggle 235, which generates an enabling command 237. The resulting enabling command 237 alternately enables and disables the LED driver 240, which turns on and off, respectively, the LED 250. The power-on delay 290 remains inactive until the input signal 202 is terminated and a new input signal 202 is initialized and received by the power-on delay 290. When step 306 is completed, the process continues to the END step.

Figure 4:
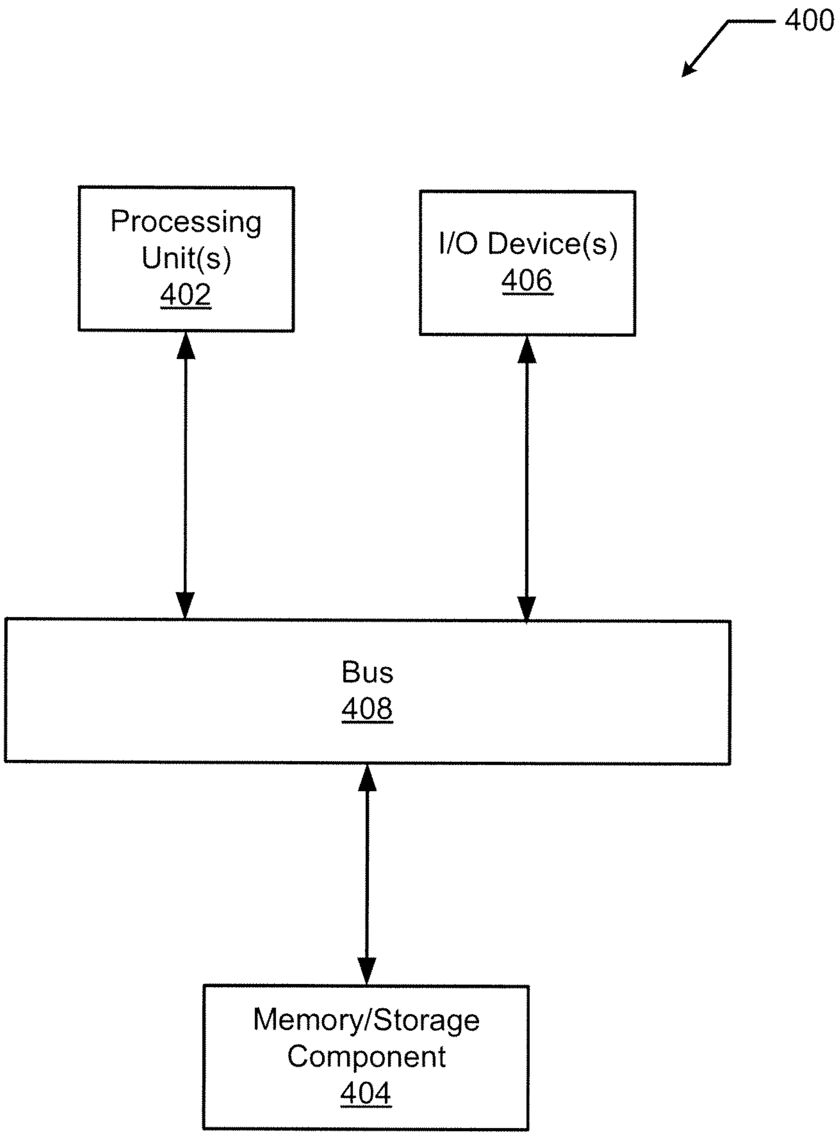
FIG. 4 shows a computer system for providing synchronous control for a plurality of LED units within a LED fixture in accordance with certain exemplary embodiments.

FIG. 4 illustrates one embodiment of a computing device 400 capable of implementing one or more of the various techniques described herein, and which may be representative, in whole or in part, of the elements described herein. Computing device 400 is only one example of a computing device and is not intended to suggest any limitation as to scope of use or functionality of the computing device and/or its possible architectures. Neither should computing device 400 be interpreted as having any dependency or requirement relating to any one or combination of components illustrated in the example computing device 400.

Computing device 400 includes one or more processors or processing units 402, one or more memory/storage components 404, one or more input/output (I/O) devices 406, and a bus 408 that allows the various components and devices to communicate with one another. Bus 408 represents one or more of any of several types of bus structures, including a memory bus or memory controller, a peripheral bus, an accelerated graphics port, and a processor or local bus using any of a variety of bus architectures. Bus 408 can include wired and/or wireless buses.

Memory/storage component 404 represents one or more computer storage media. Memory/storage component 404 may include volatile media (such as random access memory (RAM)) and/or nonvolatile media (such as read only memory (ROM), flash memory, optical disks, magnetic disks, and so forth). Memory/storage component 404 can include fixed media (e.g., RAM, ROM, a fixed hard drive, etc.) as well as removable media (e.g., a Flash memory drive, a removable hard drive, an optical disk, and so forth).

One or more I/O devices 406 allow a customer, utility, or other user to enter commands and information to computing device 400, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 400 may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 400 includes at least the minimal processing, input, and/or output means necessary to practice one or more embodiments.

Further, those skilled in the art will appreciate that one or more elements of the aforementioned computer device 400 may be located at a remote location and connected to the other elements over a network. Further, certain exemplary embodiments may be implemented on a distributed system having a plurality of nodes, where each portion of the implementation (e.g., counter 230, toggle 235, detector 225, LED driver 240) may be located on a different node within the distributed system. In one or more embodiments, the node corresponds to a computer system. Alternatively, the node may correspond to a processor with associated physical memory. The node may alternatively correspond to a processor with shared memory and/or resources.

Figure 5A:
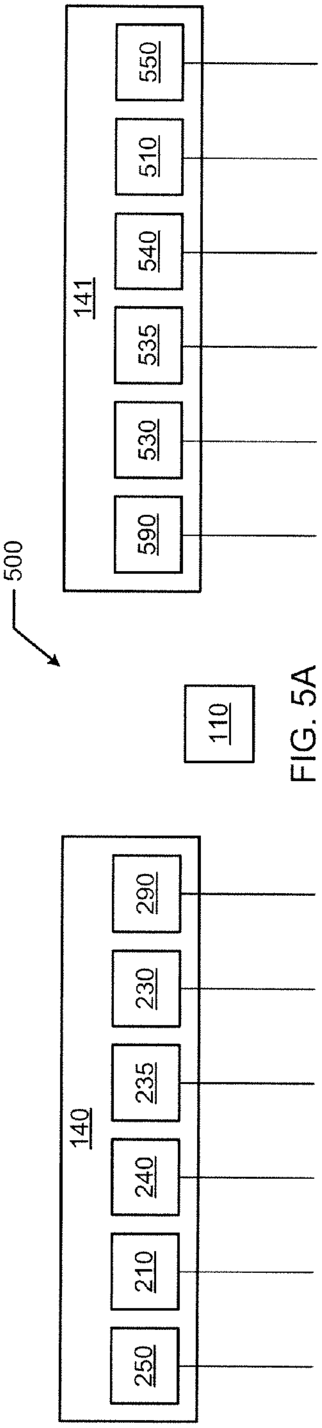
FIGS. 5A-E show an example of stand-alone synchronization in a LED fixture having multiple LED units using certain exemplary embodiments.

FIGS. 5A-E show an example of stand-alone synchronization in a LED fixture 500 having multiple LED units using certain exemplary embodiments. The example refers to FIGS. 1, 2, and 5. In this example, there are two LED units, LED unit 1 140 and LED unit 2 141. While each LED unit has all the components (e.g., amplifier 215, detector 225, toggle 235 and 535) described above with respect to FIG. 2, not all components are shown in FIGS. 5A-E. In FIG. 5A, there is no activity in the system 500. Specifically, the CCR 110 (as well as the isolation transformers associated with each LED unit) are not sending or receiving an input signal 202.

Figure 5B:
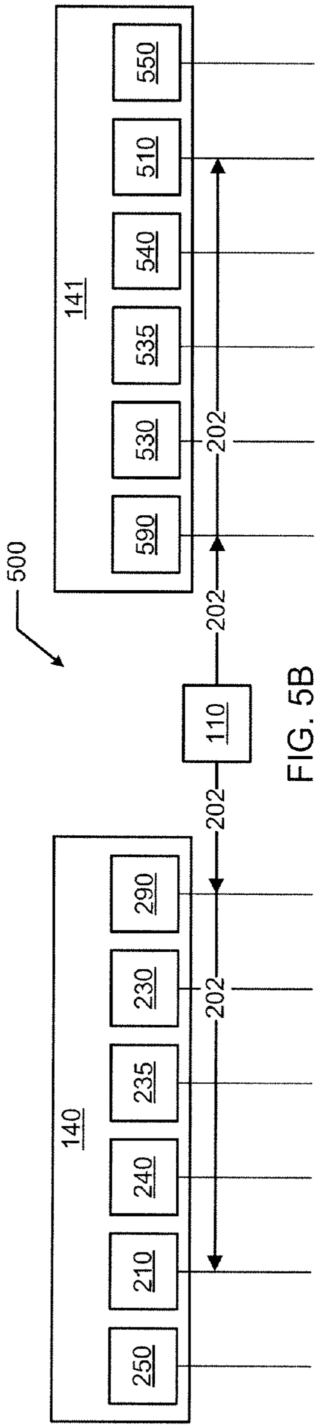

FIG. 5B shows a point in time where the input signal 202 is initiated by the CCR 110. The input signal 202 is sent simultaneously to LED unit 1 140 and LED unit 2 141. Specifically, using certain exemplary embodiments, the input signal 202 is sent to the transformer 210 and the power-on delay 290 of LED unit 1 140. In addition, the input signal 202 is sent to the transformer 510 and the power-on delay 590 of LED unit 2 141.

Figure 5C:
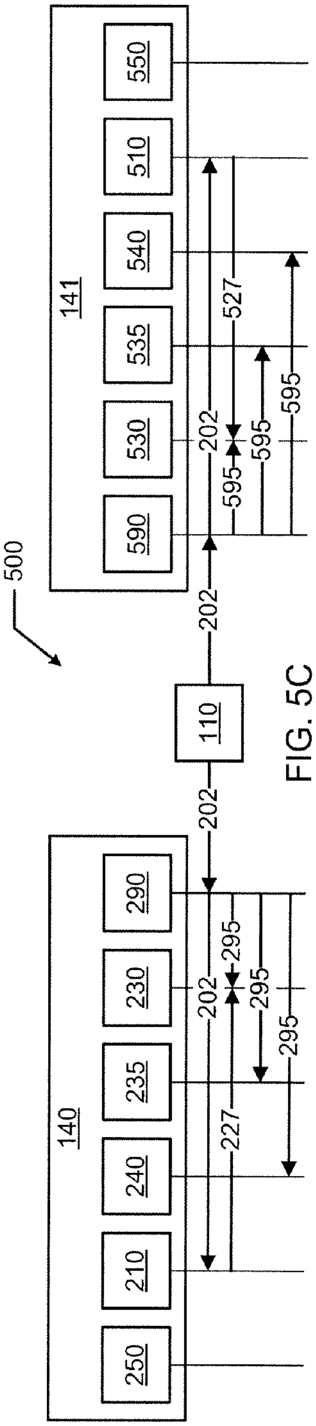

FIG. 5C shows up to several cycles (e.g., tens of milliseconds) after the point in time of FIG. 5B. In FIG. 5C, the input signal 202 continues to be sent to transformer 210 and the power-on delay 290 of LED unit 1 140 and the transformer 510 and the power-on delay 590 of LED unit 2 141. The power-on delay 290 of LED unit 1 140 is activated by the input signal 202. As a result, the power-on delay 290 of LED unit 1 140 sends a power-on delay signal 295 to the counter 230, the toggle 235, and the LED driver 240. Similarly, the power-on delay 590 of LED unit 1 141 is activated by the input signal 502. As a result, the power-on delay 590 of LED unit 1 141 sends a power-on delay signal 595 to the counter 530, the toggle 535, and the LED driver 540.

At the same time, as shown in FIG. 5C, the transformer of LED unit 1 140 receives the input signal 202 and process the input signal 202, using the amplifier, filter, and detector (not shown) to send a pulse signal to the counter 230. However, because the counter 230 is constantly being resent by the power-on delay signal 295, the counter does not count based on the pulse signal derived from the input signal 202. In effect, the counter 230 is overridden. Similarly, the transformer 510 of LED unit 2 141 receives the input signal 202 and process the input signal 202, using the amplifier, filter, and detector (not shown) to send a pulse signal to the counter 530. However, because the counter 530 is constantly being resent by the power-on delay signal 595, the counter does not count based on the pulse signal derived from the input signal 202.

The scenario described above with respect to FIG. 5C continues for the period of time that the power-on delay 290 generates and sends the power-on delay signal 295 to the counter 230, the toggle 235, and the LED driver 240. In this example, the period of time is approximately 8 seconds. After the period of time expires, the power-on delay 290 stops sending the power-on delay signal 295. This point in time is shown in FIG. 5D.

In this example, the toggle 235 of LED unit 1 140 has a default state of "ON." In other words, the initial setting for the toggle 235 is on. On the other hand, the toggle 535 of LED unit 2 141 has a default state of "OFF." FIG. 5D captures a point in time within the first counting sequence for the counters 230 and 530. With respect to LED unit 1 140, the transformer 210 receives the input signal 202 and processes the input signal 202, using the amplifier, filter, and detector (not shown) to send a pulse signal to the counter 230. Because the power-on delay signal 295 is no longer being sent to the counter 230, the counter 230 begins its counting sequence upon receipt of the pulse signal. The counter 230 generates a carry bit 232 during the counting cycle and sends the carry bit 232 to the toggle 235. Because the toggle 235 has a default state of "ON" and because the power-on delay signal 295 set the toggle to the default state, the toggle 235 generates an enabling command 237 and sends the enabling command 237 to the LED driver 240. The enabling command 237 enables the LED driver 240, which takes the LED driver 240 out of the disabled state caused by the power-on delay signal 295. With the LED driver 240 enabled, the LED driver 240 generates a LED signal 245 and sends the LED signal 245 to the LED 250. When the LED 250 receives the LED signal 245, the LED 250 illuminates.

Figure 5D:
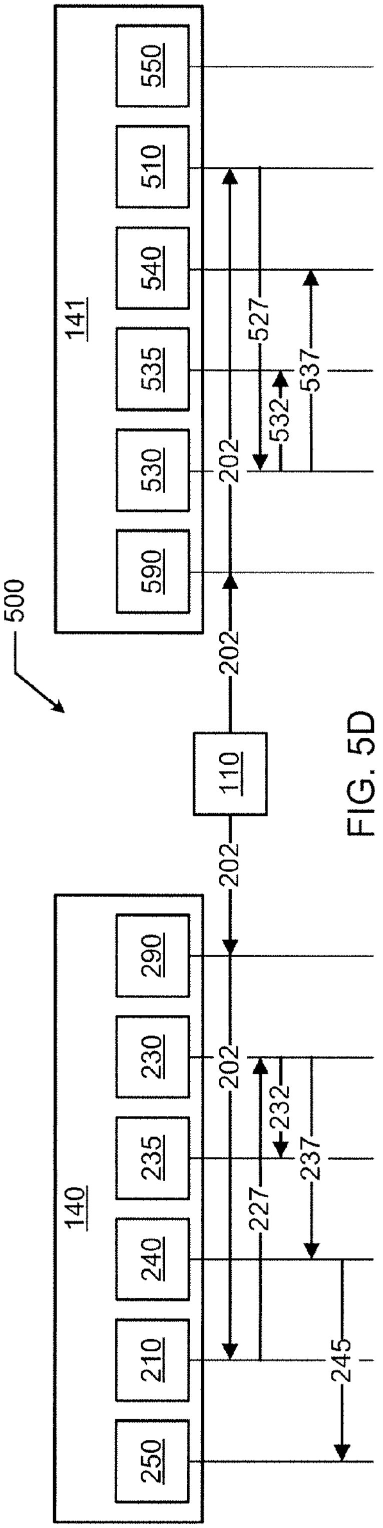

Simultaneously, as shown in FIG. 5D, with respect to LED unit 2 141, the transformer 510 receives the input signal 202 and processes the input signal 202, using the amplifier, filter, and detector (not shown) to send a pulse signal to the counter 530. Because the power-on delay signal 595 is no longer being sent to the counter 530, the counter 530 begins its counting sequence upon receipt of the pulse signal. The counter 530 generates a carry bit 532 during the counting cycle and sends the carry bit 532 to the toggle 535. Because the toggle 535 has a default state of "OFF" and because the power-on delay signal 595 set the toggle to the default state, the toggle 535 does not generate an enabling command 537. Consequently, the LED driver 540 remains in the disabled state caused by the power-on delay signal 595. With the LED driver 540 disabled, the LED 550 remains off.

Figure 5E:
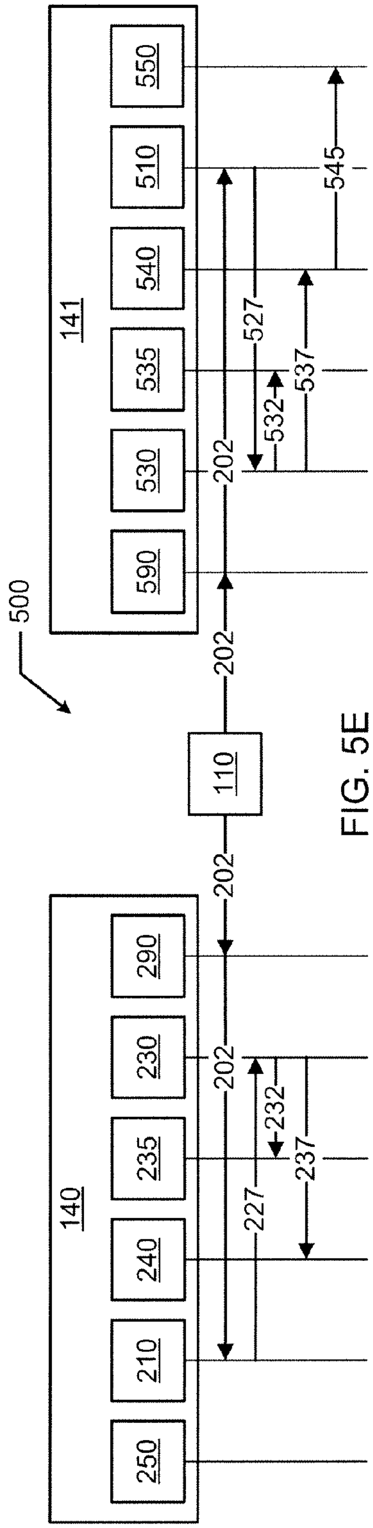

In this example, the counter 230 and the counter 530 are modulo 60 counters and the frequency of the system is 60 Hz. As a result, each counting cycle of the counter 230 and counters 530 is approximately one second. FIG. 5E shows the status of the system 500 approximately one second after the point in time captured in FIG. 5E. In other words, FIG. 5E shows the subsequent counting cycle of counter 230 and counter 530 relative to FIG. 5D.

In FIG. 5E, the power-on delay 290 of LED unit 1 140 and the power-on delay 590 of LED unit 2 141 remain inactive, although they both still continue to receive the input signal 202. The input signal 202 also continues to be received by the transformer 210 of LED unit 1 140 and by the transformer 510 of LED unit 2 141. With respect to LED unit 1 140, the transformer 210 processes the input signal 202, using the amplifier, filter, and detector (not shown) to send a pulse signal to the counter 230. The counter 230 generates a carry bit 232 during the counting cycle and sends the carry bit 232 to the toggle 235. Because the toggle 235 was in the "ON" state in the previous counting cycle (when receiving the previous carry bit 232), the toggle 235 changes state to the "OFF" state upon receiving the carry bit 232 in FIG. 5E. As a result, the toggle 235 does not generate an enabling command 237. Consequently, the LED driver 240 is changed to the disabled state. With the LED driver 240 disabled, the LED 250 is not illuminated.

Simultaneously, as shown in FIG. 5E, with respect to LED unit 2 141, the transformer 510 receives the input signal 202 and processes the input signal 202, using the amplifier, filter, and detector (not shown) to send a pulse signal to the counter 530. The counter 530 generates a carry bit 532 during the counting cycle and sends the carry bit 532 to the toggle 535. Because the toggle 535 was in the "OFF" state in the previous counting cycle (when receiving the previous carry bit 532), the toggle 535 changes state to the "ON" state upon receiving the carry bit 532 in FIG. 5E. As a result, the toggle 535 generates an enabling command 537 and sends the enabling command 537 to the LED driver 540. The enabling command 537 enables the LED driver 540, which takes the LED driver 540 out of the disabled state from the previous counting cycle. With the LED driver 540 enabled, the LED driver 540 generates a LED signal 545 and sends the LED signal 545 to the LED 550. When the LED 550 receives the LED signal 545, the LED 550 illuminates.

As long as the input signal 202 continues to be delivered to LED unit 1 140 and LED unit 2 141, the process continues to alternate between the states shown in FIGS. 5D and 5E. Once the input signal 202 is interrupted, then the system reverts to the status shown above with respect to FIG. 5A.

Exemplary embodiments provide for a method of providing synchronous control for a number of LED units within a LED fixture. Exemplary embodiments also provide for a LED fixture and a LED unit within a fixture having one or more components performing the aforementioned method. Using exemplary embodiments, a LED light fixture can synchronize a number of LED units within the LED light fixture without any control external to the LED light fixture. Exemplary embodiments can be used in a number of applications, including but not limited to airfield applications.

In addition, exemplary embodiments meet one or more of a number of standards and/or regulations that apply to such a LED light fixture. For example, exemplary embodiments can be used to meet the requirements for a model L862G LED light that is used to identify an intersection of a taxiway with an active runway at an airfield.

Further, exemplary embodiments save time, material, and money in installing and maintaining a light fixture. Specifically, using exemplary embodiments described herein reduces or eliminates the need for junction boxes, conduit, terminal blocks, fuse blocks, conductors, and a number of other components associated with external control of the LED light fixture. In addition, the use of exemplary embodiments allows for easier installation of the LED light fixture.

Although embodiments described herein are made with reference to exemplary embodiments, it should be appreciated by those skilled in the art that various modifications are well within the scope and spirit of this disclosure. Those skilled in the art will appreciate that the exemplary embodiments described herein are not limited to any specifically discussed application and that the embodiments described herein are illustrative and not restrictive. From the description of the exemplary embodiments, equivalents of the elements shown therein will suggest themselves to those skilled in the art, and ways of constructing other embodiments using the present disclosure will suggest themselves to practitioners of the art. Therefore, the scope of the exemplary embodiments is not limited herein.

What is claimed is:

1. A method of providing synchronous control for a plurality of light-emitting diode (LED) units within a LED fixture, the method comprising:

receiving an input signal;

sending, in response to receiving the input signal and for a period of time, a power-on delay signal to the plurality of LED units, wherein each LED unit comprises a counter, a toggle, and a LED driver, wherein the power-on delay signal resets the counter, initializes the toggle, and disables the LED driver; and terminating, after the period of time, the power-on delay signal.

2. The method of claim 1, wherein the period of time is sufficient to allow the input signal to stabilize into a substantially consistent wave form.

3. The method of claim 2, wherein the period of time is approximately eight seconds.

4. The method of claim 1, wherein the counter operates based on the input signal after the power-on delay signal is terminated.

5. The method of claim 4, wherein the LED driver is enabled based on the input signal after the power-on delay signal is terminated.

6. The method of claim 5, wherein the input signal is converted to a pulse signal before being received by the counter.

7. The method of claim 1, wherein the LED fixture is used on an airfield runway.

8. The method of claim 7, wherein the LED fixture is a model L852G.

9. A light-emitting diode (LED) fixture comprising a plurality of LED units, wherein each LED unit comprises:

a LED driver having a plurality of states comprising a disabled state and an enabled state, wherein the LED driver controls at least one LED;

a toggle communicably coupled to the LED driver and having a plurality of states comprising a default state, an on state, and an off state, wherein the toggle sends a plurality of signals to the LED driver to activate one of the plurality of states of the LED driver;

a counter communicably coupled to the toggle and configured to send a carry bit to the toggle; and a power-on delay module configured to:

receive input power derived from a power source;

send, based on receiving the input power, a power-on delay signal to the LED driver, the toggle, and the counter for a period of time; and terminate the power-on delay signal after the period of time expires, wherein the power-on delay signal resets the counter, initializes the toggle, and disables the LED driver during the period of time.

10. The LED fixture of claim 9, further comprising:

a zero crossing detector communicably coupled to the counter and configured to generate a plurality of pulse signals that correspond to the input signal.

11. The LED fixture of claim 10, further comprising:

a current sense transformer communicably coupled to the counter and configured to generate pulse signals that correspond to the input signal.

12. The LED fixture of claim 11, further comprising:

a operational amplifier communicably coupled to the current sense transformer and configured to increase the amplitude of the input signal; and a low pass filter communicably coupled to the operational amplifier and the zero crossing detector, wherein the low pass filter is configured to remove the low frequency signals from the input signal.

13. The LED fixture of claim 10, wherein the plurality of pulse signals generated by the zero crossing detector drives the counter after the power-on delay signal is terminated.

14. The LED fixture of claim 9, wherein the input signal comprises a plurality of repeating cycles, wherein each of the plurality of repeating cycles comprises a zero crossing.

15. The LED fixture of claim 14, wherein the input signal is a chopped sine wave.

16. The LED fixture of claim 9, wherein the plurality of LED units is an even number.

17. The LED fixture of claim 16, wherein the toggle for half of the LED units is initially set to the on state, and wherein the toggle for a remainder of the LED units is initially set to the off state.

18. The LED fixture of claim 17, wherein the each of the half of the LED units comprising the toggle initially set to the on state alternate in series with each of the remainder of the LED units comprising the toggle initially set to the off state.

19. The LED fixture of claim 9, wherein the toggle stops sending the carry bit to the toggle when the input signal is interrupted.

20. A light-emitting diode (LED) unit, comprising:

a LED driver having a plurality of states comprising a disabled state and an enabled state, wherein the LED driver controls at least one LED;

a toggle communicably coupled to the LED driver and having a plurality of states comprising an on state and an off state, wherein the toggle sends a plurality of signals to the LED driver to activate one of the plurality of states of the LED driver;

a counter communicably coupled to the toggle and configured to send a carry bit to the toggle; and a power-on delay module configured to:

receive input power derived from a power source;

send, based on receiving the input power, a power-on delay signal to the LED driver, the toggle, and the counter for a period of time; and terminate the power-on delay signal after the period of time expires, wherein the power-on delay signal resets the counter, initializes the toggle, and disables the LED driver during the period of time.

* * * * *